United States Patent [19]
Czuk et al.

[11] Patent Number: 4,721,323
[45] Date of Patent: Jan. 26, 1988

[54] FIFTH WHEEL HITCH

[75] Inventors: Felix S. Czuk, Kalamazoo, Mich.; Robert S. Bowen, Shipshewana, Ind.

[73] Assignee: Masco Corporation of Indiana, Taylor, Mich.

[21] Appl. No.: 887,149

[22] Filed: Jul. 17, 1986

[51] Int. Cl.$^4$ .............................................. B62D 53/10
[52] U.S. Cl. ..................... 280/433; 280/435; 280/438 R
[58] Field of Search ............... 280/433, 434, 435, 436, 280/438 R, 495, 504, 508, 510, 437, 438 A, 439, 440

[56] References Cited

U.S. PATENT DOCUMENTS

| | | | |
|---|---|---|---|
| 1,982,914 | 12/1934 | Hathorn | 280/436 |
| 2,138,679 | 11/1938 | Sherman | 280/436 |
| 2,429,532 | 10/1947 | Stephen | 280/436 |
| 2,501,884 | 3/1950 | Apgar | 280/435 |
| 2,663,575 | 12/1953 | Ketel | 280/435 |
| 2,925,286 | 2/1960 | Hodges | 280/434 |
| 3,392,992 | 5/1966 | Baker et al. | 280/423 R |
| 4,208,062 | 6/1980 | Maassen | 280/434 |
| 4,227,713 | 3/1979 | Blodgett et al. | 280/434 |

FOREIGN PATENT DOCUMENTS

| | | | |
|---|---|---|---|
| 47400 | 3/1982 | European Pat. Off. | 280/433 |
| 2302280 | 7/1974 | Fed. Rep. of Germany | 280/435 |

Primary Examiner—John J. Love
Assistant Examiner—Everett G. Diederiks, Jr.
Attorney, Agent, or Firm—Flynn, Thiel, Boutell & Tanis

[57] ABSTRACT

A trailer hitch mountable on an upwardly facing surface of a vehicle capable of movement in a forward direction includes a base which can be fixedly secured to the upwardly facing surface and a coupling arrangement supported on the base and adapted to releasably grip a coupling element of a trailer. The base includes two support elements adapted to be fixedly secured at spaced locations to the upwardly facing surface, and a unitary pedestal which can be releasably fixedly secured to the two support elements. The coupling arrangement includes a hitch member having an upwardly facing surface and a slot which extends forwardly thereinto from a rear edge thereof, and two jaws supported for relative pivotal movement about respective pivot axes between a gripping position and a release position. An arrangement for actuating the jaws includes an elongate, transversely extending rod and a link element which extends between and is operatively coupled to the rod and a first of the jaws. An arrangement for effecting movement of the second jaw synchronously with and in response to movement of the first jaw includes a radially outwardly projecting coupling plate on each jaw, one coupling plate having a pin which is slidably received in a slot in the other coupling plate.

19 Claims, 6 Drawing Figures

FIFTH WHEEL HITCH

FIELD OF THE INVENTION

The present invention relates generally to a trailer hitch and, more particularly, to a fifth wheel hitch which is adapted to be mounted on the bed of a pick-up truck.

BACKGROUND OF THE INVENTION

A conventional and commercially available fifth wheel trailer hitch includes two separate brackets which are each mounted adjacent a wheel well of a pick-up truck and are each secured at least in part to either the wheel well or to a side wall of the pick-up truck. A removable hitch assembly extends between and has each end removably pivotally supported on a respective one of the brackets. A trailer hitch of this conventional type is disclosed in Baker et al U.S. Pat. No. 3 392 992. Although such conventional hitches have generally been adequate for their intended purposes, they have not been satisfactory in all respects.

More specifically, the desire for fuel economy has led over the past several years to the introduction and popularity of small, lightweight pick-up trucks, as a result of which the various commercially available pick-up trucks have beds of different widths and thus have side walls and wheel wells which are spaced by different widths. Consequently, since the support brackets of the conventional hitch are provided adjacent and secured to the wheel wells and/or the side walls of the pick-up, the distance between the brackets will vary with the width of the bed, and it is thus necessary to manufacture several versions of the hitch assembly which have different lengths corresponding to the various widths of the pick-up truck beds available on the market.

Another disadvantage results from the fact that, in order to minimize weight and thus optimize fuel economy in many pick-up trucks, the side walls and wheel wells are presently being made of thinner and more lightweight metal than has typically been used in the past. Consequently, during normal operational use of the conventional hitch, the portions of the support brackets which are bolted to the wheel wells or side walls often exert forces on the wheel wells or side walls which deform the wheel wells and side walls and can even cause the connecting bolts to be pulled completely out of the wheel wells or side walls.

A further disadvantage has resulted from the fact that the support brackets of the conventional hitch, which are permanently mounted to the truck, frequently interfere with or prevent certain uses of the bed of the truck even when the removable hitch assembly has been detached from the brackets. For example, in many pick-up trucks which are not full-size trucks, the distance between the wheel wells is designed to be slightly greater than the width of a standard sheet of plywood and paneling, so that a sheet of plywood or paneling can be placed relatively flat on the bed of the truck between the wheel wells. However, where the support brackets of the trailer hitch are each permanently mounted just inwardly of a respective wheel well and project upwardly from the truck bed to the top of the wheel wells, as in the hitch disclosed in abovementioned U.S. Pat. No. 3 392 992, they reduce the effective width between the wheel wells sufficiently so that sheets of plywood or paneling do not fit therebetween.

Accordingly, it is an object of the present invention to provide an improved fifth wheel trailer hitch mountable on the bed of a pick-up truck, in which a single model of the hitch can be installed in any pick-up truck, regardless of the bed width.

It is a further object of the present invention to provide a trailer hitch, as aforesaid, in which the hitch is attached only to the bed of the pick-up truck and not to the side walls or wheel wells thereof, but still provides a safe and dependable connection between a trailer and the pick-up truck.

It is a further object of the present invention to provide a trailer hitch, as aforesaid, which has a hitch assembly that can be quickly and easily removed from the pick-up truck and, when removed, permits full and normal use of the bed of the pick-up truck.

It is a further object of the present invention to provide a trailer hitch, as aforesaid, which is lightweight and compact but nevertheless very sturdy. In order to achieve an appropriate degree of compactness, it is an object of the invention to provide an actuating arrangement for the coupling mechanism which is very compact in size.

It is a further object of the present invention to provide a trailer hitch, as aforesaid, which is capable of smooth and efficient engagement and disengagement, and which is relatively inexpensive to manufacture and assemble.

SUMMARY OF THE INVENTION

A first form of the present invention involves the provision of a trailer hitch which includes a base adapted to be fixedly secured to an upwardly facing surface of a vehicle and a coupling arrangement supported on the base and adapted to releasably couple the coupling element of a trailer to the hitch. The coupling arrangement includes a hitch member having an upwardly facing surface thereon and a slot which extends forwardly thereinto from a rear edge thereof and opens through the upwardly facing surface, first and second jaws supported for relative movement between a gripping position and a release position, and a selectively actuable actuating arrangement for effecting movement of the jaws. The actuating arrangement includes an elongate, approximately horizontal actuating member extending transversely of the forward direction and supported for lengthwise movement, a link element which extends between and is operatively coupled to the actuating member and the first jaw so as to effect movement of the first jaw in response to movement of the actuating member, and an arrangement which effects movement of the second jaw synchronously with and in response to movement of the first jaw.

An alternative form of the present invention involves the provision of a trailer hitch which includes a base adapted to be fixedly secured to an upwardly facing surface of a vehicle, and a coupling arrangement which is supported on the base and can releasably couple a coupling element on a trailer to the hitch. The coupling arrangement includes a hitch member having an upwardly facing surface thereon and a slot which extends forwardly thereinto from a rear edge thereof and opens through the upwardly facing surface, first and second gripping members supported for pivotal movement about respective pivot axes disposed on opposite sides of the slot, and a selectively actuable arrangement for effecting movement of the first gripping member. An arrangement is provided to effect movement of the second gripping member synchronously with and in response to movement of the first gripping member, and includes each gripping member having a coupling plate which extends approximately horizontally outwardly therefrom, a first of the coupling plates having thereon a pin which is approximately parallel to and is spaced radially from the pivot axes of the gripping members, and a second of the coupling plates having therein an elongate slot which slidably receives the pin on the first coupling plate.

A further form of the present invention involves the provision of a trailer hitch which is adapted to be mounted on an upwardly facing surface of a vehicle and which includes: first and second support elements which are adapted to be fixedly secured directly to the upwardly facing surface on the vehicle at locations spaced from each other in the direction of movement of the vehicle and which each have a small vertical thickness and thus project only a small distance above the upwardly facing surface; a unitary pedestal which can be removably placed on the first and second support elements; an arrangement for releasably fixedly securing the unitary pedestal to the first and second support elements; and a coupling arrangement supported on the pedestal at an upper end thereof for releasably gripping a coupling element on a trailer.

BRIEF DESCRIPTION OF THE DRAWINGS

A preferred embodiment of the present invention will be described in detail hereinafter with reference to the drawings, in which.

Certain terminology is used herein for convenience in reference only and is not to be considered limiting. For example, the words "up" and "down" will designate directions in the drawings to which reference is made. The words "forward" and "rearward" will refer to the forward and rearward directions of movement of the pick-up truck shown in FIG. 1. The words "in" and "out" will refer to directions toward and away from the geometric center of a specified part or assembly.

DETAILED DESCRIPTION

The trailer hitch disclosed in the drawings is of the general type of trailer hitch disclosed in Baker et al U.S. Pat. No. 3 392 992, the disclosure of which is incorporated herein by reference.

Figure 1:
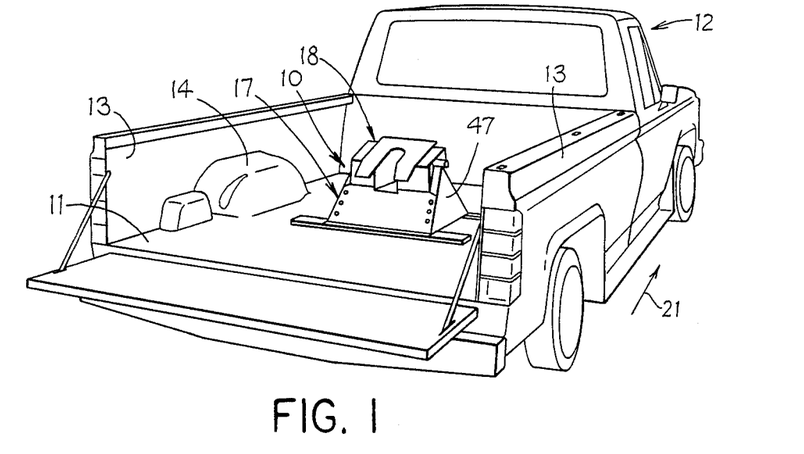
FIG. 1 is a perspective view of a pick-up truck having installed on a bed thereof a trailer hitch which embodies the present invention.

FIG. 1 illustrates a trailer hitch 10 which embodies the present invention and is secured to the upwardly facing surface of the bed 11 of a pick-up truck 12. As evident from FIG. 1, the trailer hitch 10 is not in any way connected to the side walls 13 or wheel wells 14 of the pick-up truck 12.

The trailer hitch 10 includes a base assembly 17 and a hitch assembly 18, the hitch assembly 18 serving as a coupling arrangement which can releasably couple a coupling element of a trailer to the trailer hitch. As explained in more detail later, the hitch assembly 18 has coaxial cylindrical pins 19 (FIGS. 2 and 3) secured at each end thereof and supporting the hitch assembly 18 for pivotal movement relative to the base assembly 17 about a horizontal pivot axis extending transversely of the forward direction of movement of the pick-up truck 12 (arrow 21 in FIG. 1).

Figure 2:
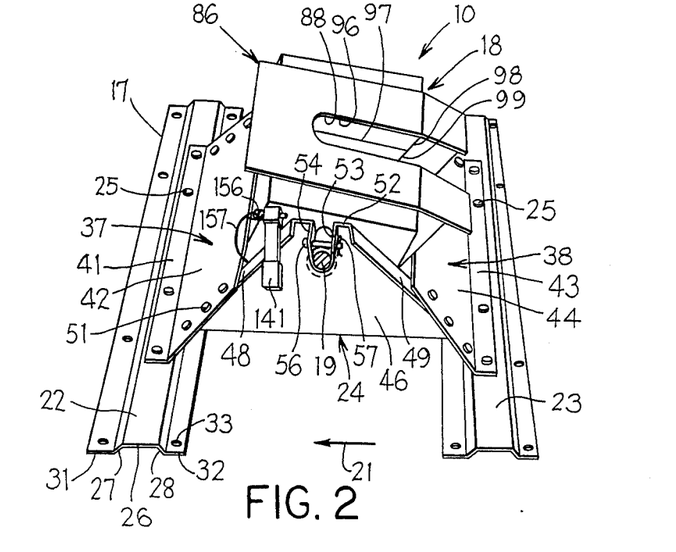
FIG. 2 is a perspective view of the trailer hitch shown in FIG. 1.

Referring to FIG. 2, the base assembly 17 of the trailer hitch 10 includes two elongate support elements 22 and 23 and a unitary pedestal 24 which is removably secured to each of the support elements 22 and 23 by four bolts 25. The support elements 22 and 23 are parallel, and are spaced from each other in and extend perpendicular to the forward direction of movement 21 of the truck 12. Each of the support elements 22 and 23 is a metal plate bent to form a channel which includes a horizontal bight 26, legs 27 and 28 extending downwardly from opposite sides of the bight 26, and flanges 31 and 32 extending outwardly from the lower ends of the legs 27 and 28. The flanges 31 and 32 each have a plurality of spaced openings 33 therethrough and, when the hitch 10 is installed in the truck 12, the support elements 22 and 23 are each fixedly secured to the bed 11 of the truck 12 by a plurality of not-illustrated bolts which each extend through a respective opening 33.

The pedestal 24 includes a front plate 37 and a rear plate 38. The front plate 37 is bent to define a flange portion 41 which is disposed on top of and extends along the bight of the support element 22, and a front wall portion 42 which extends upwardly and rearwardly from the flange portion 41. Similarly, the rear plate 38 is bent to define a flange portion 43 which is disposed on top of and extends along the bight of the support element 23, and a rear wall portion 44 which extends upwardly and forwardly from the flange portion 43, the front wall portion 42 and the rear wall portion 44 of the plates 37 and 38 converging upwardly with respect to each other. The bolts 25 extend through openings in the flanges 41 and 43 and engage threaded holes provided in the bights of the support elements 22 and 23. The pedestal 24 also includes two approximately triangular end walls 46 and 47. The end walls 46 and 47 are mirror images of each other, and in the preferred embodiment are in fact completely identical. Therefore, only the end wall 46 is described in detail.

Referring to FIG. 2, two flanges 48 and 49 extend along and project outwardly from respective edges of the end wall 46. The flanges 48 and 49 are respectively disposed against the front wall portion 42 and rear wall portion 44 of the plates 37 and 38, and are fixedly secured thereto in any conventional manner, for example using bolts or rivets 51. The upper end portion 52 of the end wall 46 projects upwardly above the tops of the front wall portion 42 and rear wall portion 44 of the plates 37 and 38. The end wall 46 has a slot 53 therein which extends downwardly from the upper end 52 thereof and which has a rounded lower end. A U-shaped flange 54 extends along and projects outwardly from the edges of the slot 53. In the preferred embodiment, the end wall 46 and the flanges 48, 49 and 54 are integral portions of a single bent metal plate.

The hitch assembly 18 is located intermediate the upper ends 52 of the end walls 46 and 47, and the slots 53 in the end walls each rotatably receive a respective one of the cylindrical pins 19 provided on the hitch assembly 18, each slot 53 having a width slightly greater than the diameter of the pins 19. The hitch assembly 18 can shift laterally a small amount relative to the end walls 46 and 47, the pins 19 sliding axially relative to the walls 46 and 47. Each cylindrical pin 19 is held at the lower end of the associated slot 53 by a cylindrical pin 56 having a head at one end and having a transverse through opening at the opposite end which removably receives a hitch pin 57, a cotter pin, or the like, the cylindrical pin 56 extending through aligned openings in opposite legs of the flange 54 at a location just above the cylindrical pin 19.

A portion of the pin 19 in FIG. 2 is cut away for clarity. Each of the cylindrical pins 19 has welded to the outer end thereof a washer 59 (FIG. 3), in order to equally distribute side loads to the two end walls 46 and 47. For example, a side load in one direction will cause the housing end wall 71 to engage the pedestal end wall 47, and the washer 59 on the pin 19 projecting outwardly from the housing end wall 72 will simultaneously engage the flange 54 on the other pedestal end wall 46.

Figure 3:
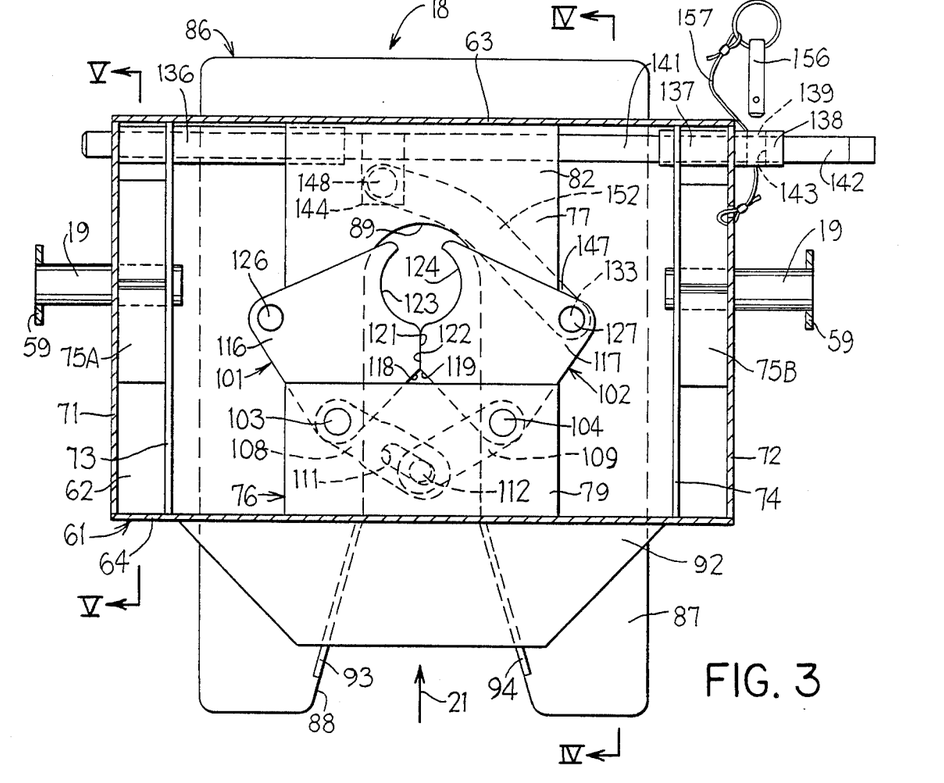
FIG. 3 is a sectional bottom view of a hitch assembly which is a component of the trailer hitch of FIG. 1, and is taken along the line III—III in FIG. 4.
Figure 4:
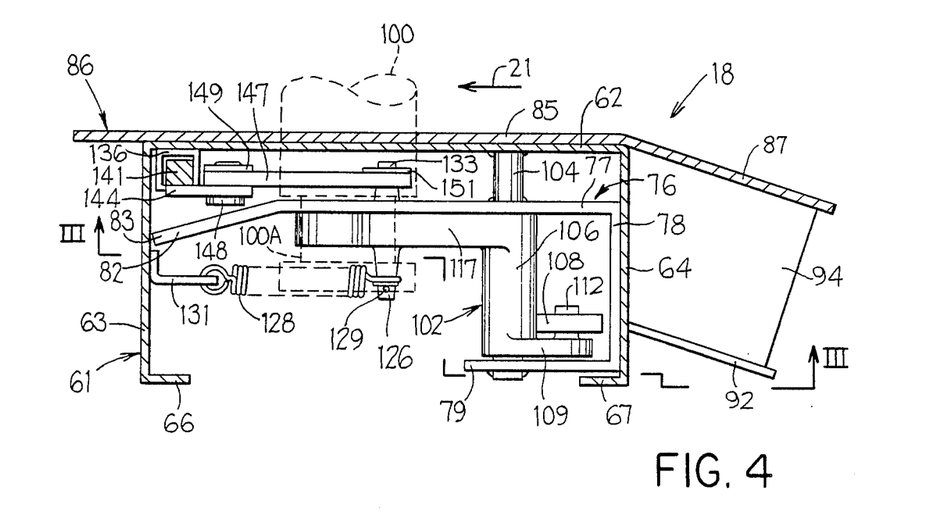
FIG. 4 is a sectional side view taken along the line IV—IV in FIG. 3.

Referring to FIGS. 3 and 4, the hitch assembly 18 includes an approximately U-shaped housing channel 61 which is made from a bent metal plate and has a horizontal upper wall portion 62, front and rear wall portions 63 and 64 extending downwardly from opposite sides of the upper wall portion 62, and flanges 66 and 67 which extend horizontally inwardly a small distance from the lower ends of the front and rear wall portions 63 and 64. Outer housing end walls 71 and 72 are provided at opposite ends of the housing channel 61, and extend between and are fixedly secured to the upper wall portion 62 and front and rear wall portions 63 and 64 thereof, for example by welding. Spaced inwardly a small distance from each of the end walls 71 and 72 is a respective inner housing end wall 73 or 74 which is also fixedly secured to the housing channel 61. The end walls 71 and 73 have aligned circular openings therein which receive an end portion of one of the cylindrical pins 19, the pin 19 being fixedly secured to the end walls 71 and 73 by welding. The other pin 19 is received in openings in and is fixedly secured to the end walls 72 and 74 in a similar manner.

Figure 5:
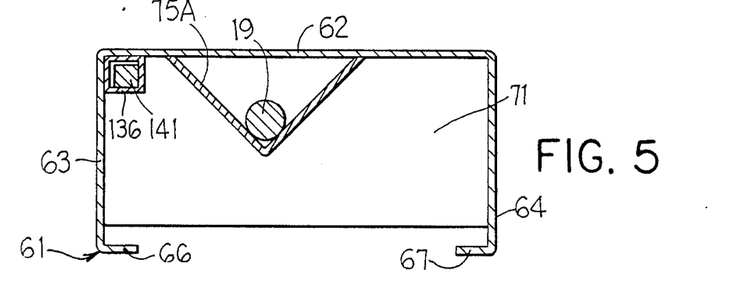
FIG. 5 is a sectional side view taken along the line V—V in FIG. 3.

An angle plate 75A is disposed between the housing end walls 71 and 73, as shown in FIGS. 3 and 5, and is welded to housing upper wall portion 62, end walls 71 and 73, and pin 19. The legs of the angle plate 75A are arranged at a right angle to each other. An identical angle plate 75B is provided between the housing end walls 72 and 74 (FIG. 3).

A bent metal support plate 76 is provided within the housing channel 61 between the inner end walls 73 and 74, and includes a horizontal top wall portion 77 which is spaced below the upper wall portion 62 of the housing channel 61, a rear wall portion 78 which extends downwardly from a rear edge of the top wall portion 77 and is disposed against and fixedly secured to the rear wall portion 64 of the channel 61, a bottom portion 79 which extends horizontally inwardly from the lower end of the rear wall portion 78 just above the flange 67 on the channel 61, and a front wall portion 82 which is inclined downwardly and forwardly from the front edge of the top wall portion 77 and has its front edge 83 welded to the front wall 63 of the channel 61.

A bent metal hitch plate 86 includes a horizontal central portion 85 which is disposed against and fixedly secured to the upper wall portion 62 of the housing channel 61, for example by welding, and has a rear portion 87 which projects rearwardly beyond the rear wall 64 of the housing channel 61 and is inclined downwardly and rearwardly. The hitch plate 86 has a slot 88 (FIGS. 2 and 3) therein which extends forwardly from the rear edge thereof, the sides of the slot 88 converging toward each other from the rear edge of the hitch plate 86 to a location approximately above the rear wall 64 of the channel 61, and then extending substantially parallel to each other to an inner end 89 of the slot, the inner end 89 of the slot being semicircular.

Vertically below the rear portion 87 of the hitch plate 86 is a brace plate 92 which has its forward edge welded to the rear wall 64 of the housing channel 61 and which is inclined downwardly and rearwardly from the rear wall portion 64 so as to extend approximately parallel to the rear portion 87 of the hitch plate 86. Two vertical gusset plates 93 and 94 extend between and are fixedly secured to the hitch plate 86 and the brace plate 92, each gusset plate 93 and 94 extending along a respective edge of the slot 88 and having its forward edge disposed against and fixedly secured to the rear portion 64 of the housing channel 61.

The upper wall portion 62 of the housing channel 61 and the top wall portion 77 of the support plate 76 have, as best depicted in FIG. 2, respective slots 96 and 97 therein which are disposed directly below and are of substantially the same size and shape as the portion of the slot 88 in the central portion 85 of the hitch plate 86. Further, the rear wall portion 64 of the housing channel 61 and the rear wall portion 78 of the support plate 76 have respective aligned slots 98 and 99 therein which extend downwardly from the upper ends thereof to a location just above the brace plate 92. The slots 98 and 99 are respectively aligned with and communicate with the slots 96 and 97. Consequently, the lower end of a conventional cylindrical vertical coupling pin 100 (FIG. 4) can move horizontally in the forward direction 21 into the slots 88, 96 and 97 and through the slots 98 and 99 until it is disposed at the inner end 89 of the slot 88, as shown in FIG. 4. The smallest distance between the sides of the slot 88 is greater than the diameter of the coupling pin 100.

The hitch assembly 18 includes two gripping members 101 and 102 which are supported for pivotal movement on respective vertical pins 103 and 104 disposed on opposite sides of the slot 88. Each of the pins 103 and 104 extends through aligned openings in and is welded to the bottom portion 79 and top wall portion 77 of the support plate 76, and each of the pins 103 and 104 has its upper end disposed against and welded to the upper wall portion 62 of the housing channel 61. The gripping members 101 and 102 are approximately mirror images of each other, although there are some differences which are described below.

The gripping member 102 includes an upright cylindrical post 106 having an axial length which is slightly less than the vertical distance between the top wall portion 77 and bottom portion 79 of the support plate 76, the post 106 having a vertical cylindrical opening therethrough which is of slightly larger diameter than and rotatably receives the pin 104. The gripping member 101 includes a similar post which is not visible in the drawings but which has the pin 103 rotatably received in a vertical cylindrical opening therethrough.

A coupling plate 108 extends horizontally and radially outwardly from the post of the gripping member 101 at a location spaced a small distance upwardly from the lower end of the post, and has a radially extending slot 111 therein at a location spaced radially outwardly from the post. The gripping member 102 has a coupling plate 109 extending horizontally and radially outwardly from the lower end of the post 106 thereof, the outer end of the coupling plate 109 being disposed below the coupling plate 108 and having thereon a vertically upwardly projecting pin 112 which is slidably received in the slot 111 in the coupling plate 108. When the gripping members 101 and 102 are in the position shown in FIG. 3, the coupling plates 108 and 109 diverge away from each other in the forward direction 21 so as to form an obtuse angle which opens in the forward direction 21.

Each of the gripping members 101 and 102 has a respective jaw plate 116 or 117 fixedly secured to and projecting horizontally outwardly from the upper end of the post thereof immediately below the top wall portion 77 of the support plate 76. As shown in FIG. 3, the jaw plate 116 has a spreading surface 118 thereon which extends approximately radially outwardly from a location near the pin 103. The jaw plate 117 has a similar spreading surface 119 thereon and, when the jaw plates 116 and 117 are in the position shown in FIG. 3, the spreading surfaces 118 and 119 are approximately perpendicular to each other and converge toward each other in the forward direction 21. At the radially outer ends of the spreading surfaces 118 and 119, the jaw plates 116 and 117 have flat stop surfaces 121 and 122 which engage each other when the jaw plates are in the position shown in FIG. 3. Immediately radially outwardly of the stop surfaces 121 and 122 are approximately semi-circular gripping surfaces 123 and 124. When the jaw plates 116 and 117 are in the position shown in FIG. 3, the gripping surfaces 123 and 124 together define an approximately circular recess which is approximately concentric to the rounded inner end 89 of the slot 88 in the hitch plate 86 and which can receive a reduced diameter portion 100A of the coupling pin 100 defined by a circumferential groove provided in the pin 100 a small distance upwardly from the lower end thereof.

At a location spaced radially outwardly from the pin 103 and angularly offset from the gripping surface 123, the jaw plate 116 has a downwardly projecting post 126. The jaw plate 117 has an equivalent post 127. An expansion spring 128 has a loop at one end which encircles the post 126, and a horizontal pin 129 extending through a transverse opening in the post 126 prevents the loop on the spring from dropping off the post 126. The opposite end of the spring 128 is supported on an L-shaped bracket 131 which is located intermediate the inner end walls 73 and 74 and is welded to the front wall portion 63 of the housing channel 61. A similar, not-illustrated expansion spring extends between the bracket 131 and the post 127 on the gripping member 102. These expansion springs continuously yieldably urge pivotal movement of the gripping members 101 and 102 toward the positions shown in FIG. 3.

The jaw plate 117 has a post 133 thereon which projects upwardly and is located directly above the downwardly projecting post 127.

A metal tube 136 of square cross section extends through and is fixedly secured in square openings provided in the inner and outer end walls 71 and 73 just below the upper wall portion 62 of housing channel 61, and a further metal tube 137 of square cross section extends through and is secured in square openings provided in the end walls 72 and 74. The tube 137 has an end portion 138 which projects outwardly past the end wall 72 and which has aligned locking openings 139 provided in opposite sides thereof.

An elongate operating rod 141 of square cross section extends through and is slidably supported for lengthwise movement in the tubes 136 and 137. The rod 141 has an end 142 which projects outwardly past the end 138 of the tube 137, which is inclined to extend outwardly and downwardly, and which has a transverse locking opening 143 therethrough which, in the position of the rod 142 shown in FIG. 3, is aligned with the locking openings 139 in the tube 137. A flange plate 144 is welded to the underside of the rod 141 and extends horizontally outwardly therefrom in a rearward direction. The end 142 of the rod 141 can be manually grasped in order to effect movement of the rod 141 between a position in which the flange plate 144 is adjacent the tube 137 and the position shown in FIG. 3 in which the flange plate 144 is adjacent the tube 136.

A horizontally extending link plate 147 has one end pivotally supported on the flange plate 144 by a pin 148 which extends vertically through aligned openings in the flange plate 144 and link plate 147 and which has a washer 149 welded to it near its upper end. The opposite end of the link plate 147 is pivotally supported on the gripping member 102 by means of an opening therein through which the post 133 on the gripping member 102 extends, the post 133 having welded to it near its upper end a washer 151. In the position shown in FIG. 3, the link plate 147 extends approximately tangentially to the path of movement of the post 133 about the pivot pin 104. As shown in FIG. 3, the center region 152 of the link plate 147 is curved slightly so that the link plate 147 does not extend across the region below the slot 88 and thus will not come into contact with the trailer coupling element 100 (FIG. 4). The actuating rod 141 and link plate 147 constitute a very compact actuating mechanism.

A safety locking pin 156 of a conventional type is coupled to the hitch assembly 18 by a flexible stranded metal cable 157, and can be inserted through the locking openings 139 and 143 when they are aligned in order to prevent movement of the rod 141 and thus releasably lock the gripping members 101 and 102 in the position shown in FIG. 3.

OPERATION

Figure 6:
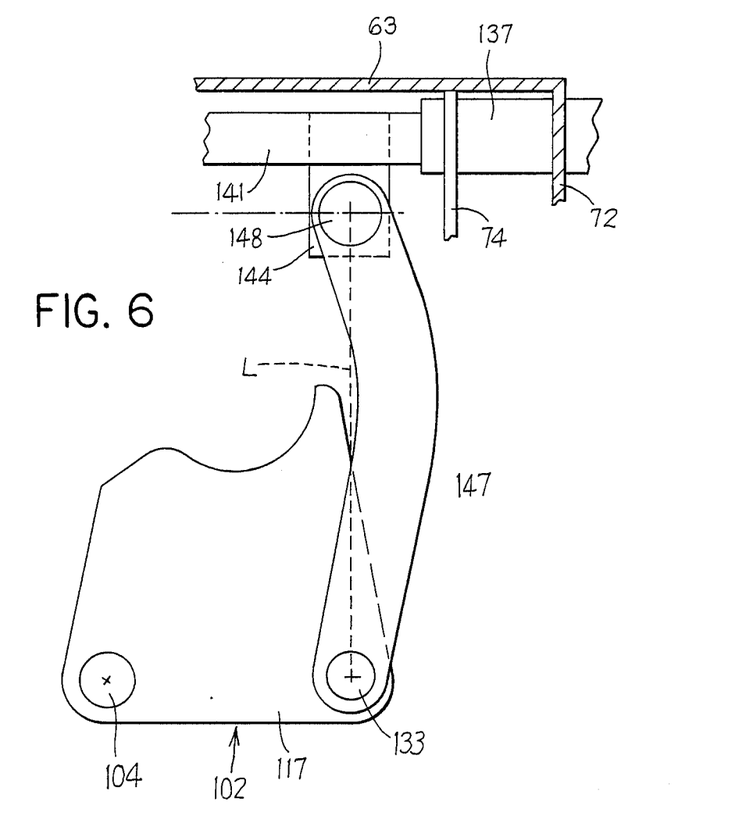
FIG. 6 is a fragmentary view of a portion of FIG. 3 showing a different operational state.

In order to couple the trailer hitch 10 to the coupling pin 100 of a trailer, the locking pin 156 is removed from the openings 139 and 143 and then the end 142 of the rod 141 is manually grasped and is pulled rightwardly in FIG. 3, so that the flange plate 144 moves from the position shown in FIG. 3 to a position adjacent the tube 137. As this movement occurs, the link plate 147 will force the post 133 to move in a rearward direction opposite the arrow 21 in FIG. 3, thereby causing the gripping member 102 to pivot clockwise against the urging of the spring 128 from the gripping position shown in FIG. 3 to a release position in which the spreading surface 119 is approximately parallel to the edge of the slot 88. Just before the rod 141 reaches its rightmost position, the pin 148 will pass through a toggle position (shown in FIG. 6) in which a common radial line L extending between the centers of the pin 148 and post 127 is exactly perpendicular to the rod 141. When the pin is to the right or left of the toggle position in FIG. 3, the springs 128 will cause the link plate 147 to respectively urge the rod 141 rightwardly or leftwardly. Thus, when the rod 141 has been moved to its rightmost position, it will stay there.

Since the pivotal movement of the gripping member 102 causes the coupling plate 109 thereof to pivot in a clockwise direction in FIG. 3, the pin 112 on the coupling plate 109 will cause the coupling plate 108 and thus the gripping member 101 to pivot in a counterclockwise direction synchronously with the gripping member 102 and against the urging of the associated spring 128. Thus, the gripping members 101 and 102 are simultaneously pivoted to release positions in which neither of the jaw plates 116 or 117 thereof is disposed immediately below the slot 88. Consequently, the truck 12 can be driven in a reverse direction toward a trailer having the coupling pin 100 so that the coupling pin 100 moves into the slot 88 in the forward direction 21 free of engagement with the gripping members 101 and 102 until it reaches the inner end of the slot 89. The rod 141 is then manually pushed a small distance leftwardly in FIG. 3 so that it passes the toggle position, and then the springs 128 will pivot the gripping members 101 and 102 until the stop surfaces 121 and 122 engage, or in other words back to the positions thereof shown in FIG. 3 in which they closely encircle the reduced diameter portion 100A provided near the lower end of the coupling pin 100. As a result, the coupling pin 100 can pivot relative to the trailer hitch 10, but is held against significant forward, rearward, sideways or vertical movement relative thereto. Then, the locking pin 156 can be inserted back through the aligned openings 139 and 143 in the tube 138 and rod 141 in order to lock the rod 141 in the position shown in FIG. 3 and thereby lock the gripping members 101 and 102 in the gripping positions shown in FIG. 3.

It is also possible to achieve engagement between the trailer hitch and the coupling element 100 in a manner similar to that just described, but without first manually pulling the rod 141 outwardly. In this case, of course, the locking pin 156 must first be removed from the openings 139 and 143. Then, as the truck 12 is moved rearwardly, the coupling pin 100 will move into the slot 88 and will engage the spreading surfaces 118 and 119 on the gripping members 101 and 102, thereby forcing the jaw plates 116 and 117 to pivot sufficiently outwardly against the urging of the associated expansion springs 128 so that the coupling pin 100 can move past the gripping members 101 and 102 toward the inner end 89 of the slot 88. The pivotal movement of the gripping member 102 will cause the link element 147 to move the rod 141 rightwardly in FIG. 1, but not as far as its toggle position. Thus, when coupling pin 100 reaches the inner end 89 of the slot 88, the expansion springs 128 will immediately pivot the gripping members 101 and 102 back to the gripping position shown in FIG. 3, which in turn will cause the link element 147 to return the rod 141 leftwardly to the position shown in FIG. 3.

In order to release the coupling pin 100 from the trailer hitch, the locking pin 156 is removed from the openings 139 and 143, and then the rod 142 is moved manually outwardly past its toggle position, so that the gripping members 101 and 102 are each pivoted to their release positions and are held in such positions by virtue of the fact that the rod 141 has passed its toggle position. Then, the truck 12 is driven forwardly and the coupling pin 100 moves rearwardly out of the slot 88 in the trailer hitch free of any contact with the gripping members 101 and 102.

When the trailer hitch 10 is not in use, it can be rapidly removed from the truck by merely removing the eight bolts 25 which secure the pedestal 24 to the support elements 22 and 23, and by then manually lifting the pedestal 24 and hitch assembly 18 out of the truck. The support elements 22 and 23 remain secured to the bed 11 of the truck 12, but have such a low profile that their presence is virtually negligible. When there is a need for the trailer hitch 10, the pedestal 24 and hitch assembly 18 are placed back on the support elements 22 and 23 and are rapidly secured thereto by replacing the eight bolts 25.

Although a particular preferred embodiment of the invention has been disclosed in detail for illustrative purposes, it will be recognized that variations or modifications of the disclosed apparatus, including the rearrangement of parts, lie within the scope of the present invention. Further, it will be recognized that the coupling pin could be provided on the truck and the hitch could be provided on the trailer.

The embodiments of the invention in which an exclusive property or privilege is claimed are defined as follows:

1. A trailer hitch which is mountable on an upwardly facing surface of a vehicle capable of movement in a forward direction and which can releasably grip a coupling element on a trailer, comprising: a base; means for fixedly securing said base to the upwardly facing surface of the vehicle; and coupling means supported on said base and adapted to releasably couple the coupling element on the trailer to said hitch; said coupling means including: a hitch member having an upwardly facing surface thereon and having a slot which extends forwardly thereinto from a rear edge thereof, which opens through said upwardly facing surface and which is adapted to receive therein a portion of the coupling element on the trailer; first and second jaws supported for relative movement between a gripping position in which said jaws can releasably grip a portion of the coupling element of the trailer and a release position in which the coupling element can be moved into and out of said slot in said hitch member substantially free of engagement with said jaws; and selectively actuable actuating means for effecting movement of said jaws from said gripping position to said release position thereof; wherein said actuating means includes an elongate, approximately horizontal actuating member extending approximately transversely to said forward direction and supported for lengthwise movement between first and second positions, and a single link element which extends between and is operatively coupled to said actuating member and said first jaw, said link element causing said first jaw to respectively move between said gripping and release positions thereof in response to movement of said actuating member between its first and second positions; wherein said coupling means includes means for causing said second jaw to respectively move between its gripping and release positions in response to movement of said first jaw between its gripping and release positions; wherein said link element has a first end supported on said actuating member for pivotal movement about a first pivot axis and has a second end supported on said first jaw for pivotal movement about a second pivot axis, said first and second pivot axes being parallel and extending approximately normal to said actuating member and said slot; and wherein as said actuating member is moved from its first to its second position, it passes through a toggle position in which a line extending radially between said first and second pivot axes is perpendicular to said actuating member.

2. The trailer hitch of claim 1, including locking means for releasably holding said actuating member in a predetermined position.

3. The trailer hitch of claim 2, including two spaced tube sections which are fixedly secured to said hitch member and which slidably receive said actuating member therein, said locking means including locking openings in said actuating member and one of said tubes which are aligned when said actuating member is in its first position and including a locking pin which can be moved into said locking openings when they are aligned.

4. The trailer hitch of claim 2, including two spaced tube sections which are fixedly secured to said hitch member and which slidably receive said actuating member therein, said locking means including locking openings in said actuating member and one of said tubes which are aligned when said actuating member is in its first position and including a locking pin which can be moved into said locking openings when they are aligned, said actuating member having a flange which is fixedly secured to and projects transversely outwardly therefrom, said flange having thereon a pin which is coincident with said first pivot axis and is rotatably disposed in an opening provided in said first end of said link element, and said first jaw having thereon a post which is coincident with said second pivot axis and is rotatably received in an opening in said second end of said link element.

5. The trailer hitch of claim 4, wherein said first and second jaws are respectively supported on said hitch member for pivotal movement about third and fourth pivot axes which are each approximately parallel to said first and second pivot axes and which are spaced from each other in a direction approximately parallel to the direction in which said actuating member extends.

6. The trailer hitch of claim 5, wherein said slot in said hitch member is disposed between said third and fourth pivot axes, and wherein each said jaw has thereon a rearwardly facing spreading surface which extends from a location in the region of to a location spaced radially from the pivot axis for such jaw, said spreading surfaces converging relative to each other in said forward direction; and including resilient means for yieldably urging said jaws toward said gripping positions thereof.

7. The trailer hitch of claim 6, wherein each said jaw has at a location spaced radially outwardly from said pivot axis thereof and said spreading surface thereon a stop surface, said stop surfaces on said jaws engaging each other when said jaws are in said gripping position to prevent pivotal movement of said jaws past said gripping positions thereof; and wherein each said jaw has at a location spaced radially outwardly from said pivot axis thereof and said stop surface thereon a gripping surface, said gripping surfaces releasably gripping a coupling element of a trailer disposed in said slot when said jaws are in their gripping positions.

8. The trailer hitch of claim 5, wherein said means for effecting movement of said second jaw in response to movement of said first jaw includes a post provided on and extending downwardly from each said jaw and includes at the lower end of each said post a coupling plate which extends approximately horizontally outwardly therefrom, a first of said coupling plates having thereon a pin which is approximately parallel to and is spaced radially from said pivot axes of said jaws, and a second of said coupling plates having therein an elongate slot which slidably receives said pin on said first coupling plate.

9. The trailer hitch of claim 8, wherein when said jaws are in said gripping positions, said coupling plates form an obtuse angle with respect to each other which opens in said forward direction, and wherein said slot in said second coupling plate extends approximately radially of said pivot axis of said jaw on which said second coupling plate is provided.

10. The trailer hitch of claim 1, including means supporting said hitch member on said base for pivotal movement about a horizontal axis which extends approximately perpendicular to said forward direction.

11. The trailer hitch of claim 1, including said actuating member having a flange which is fixedly secured to and projects transversely outwardly therefrom, said flange having thereon a pin which is coincident with said first pivot axis and is rotatably disposed in an opening provided in said first end of said link element, and said first jaw having thereon a post which is coincident with said pivot axis and is rotatably received in an opening in said second end of said link element.

12. The trailer hitch of claim 1, wherein said first and second jaws are respectively supported on said hitch member for pivotal movement about third and fourth pivot axes which are each approximately parallel to said first and second pivot axes and which are spaced from each other in a direction approximately parallel to the direction in which said actuating member extends.

13. The trailer hitch of claim 12, wherein said slot in said hitch member is disposed between said third and fourth pivot axes, and wherein each said jaw has thereon a rearwardly facing spreading surface which extends from a location in the region of to a location spaced radially from the pivot axis for such jaw, said spreading surfaces converging relative to each other in said forward direction; and including resilient means for yieldably urging said jaws toward said gripping positions thereof.

14. The trailer hitch of claim 13, wherein each said jaw has at a location spaced radially outwardly from said pivot axis thereof and said spreading surface thereon a stop surface, said stop surfaces on said jaws engaging each other when said jaws are in said gripping position to prevent pivotal movement of said jaws past said gripping positions thereof; and wherein each said jaw has at a location spaced radially outwardly from said pivot axis thereof and said stop surface thereon a gripping surface, said gripping surfaces releasably gripping a coupling element of a trailer disposed in said slot when said jaws are in their gripping positions.

15. The trailer hitch of claim 12, wherein said means for effecting movement of said second jaw in response to movement of said first jaw includes a post provided on and extending downwardly from each said jaw and includes at the lower end of each said post a coupling plate which extends approximately horizontally outwardly therefrom, a first of said coupling plates having thereon a pin which is approximately parallel to and is spaced radially from said pivot axes of said jaws, and a second of said coupling plates having therein an elongate slot which slidably receives said pin on said first coupling plate.

16. The trailer hitch of claim 15, wherein when said jaws are in said gripping positions, said coupling plates form an obtuse angle with respect to each other which opens in said forward direction, and wherein said slot in said second coupling plate extends approximately radially of said pivot axis of said jaw on which said second coupling plate is provided.

17. The trailer hitch of claim 1, including resilient means for yieldably urging said jaws toward said gripping positions thereof.

18. In a trailer hitch which is mountable on an upwardly facing surface of a vehicle capable of movement in a forward direction and which can releasably grip a coupling element on a trailer, including: a base; means for fixedly securing said base to the upwardly facing surface of the vehicle; and coupling means supported on said base and adapted to releasably couple the coupling element on the trailer to the hitch; said coupling means including: a hitch member having an upwardly facing surface thereon and having a slot which extends forwardly thereinto from a rear edge thereof, which opens through said upwardly facing surface thereof and which is adapted to receive therein a portion of the coupling element on the trailer; first and second jaws supported for pivotal movement about respective pivot axes between a gripping position in which said jaws can releasably grip a portion of the coupling elemet of the trailer and a release position in which the coupling element can be moved into and out of said slot in said hitch member substantially free of engagement with said jaws, said slot in said hitch member being located between said pivot axes of said jaws; and selectively actuable actuating means for effecting movement of said jaws from said gripping to said release position thereof; the improvement comprising wherein said actuating means includes means cooperable with said first jaw for effecting movement thereof from said gripping to said release position, and means responsive to movement of said first jaw between its gripping and release positions for effecting movement of said second jaw between its gripping and release positions, respectively, said means for effecting movement of said second jaw including a respective coupling plate fixedly coupled to each said jaw, a first of said coupling plates having thereon a pin which is approximately parallel to and is spaced radially from said pivot axes of said jaws, and a second of said coupling plates having therein an elongate slot which slidably receives said pin on said first coupling plate.

19. The trailer hitch of claim 18, wherein each said jaw has a post which extends downwardly therefrom and which has a respective said coupling plate secured to and projecting horizontally outwardly therefrom, wherein when said jaws are in said gripping positions said coupling plates form an obtuse angle with respect to each other which opens in said forward direction, wherein said pivot axis of each said jaw extends through said post on such jaw lengthwise thereof, and wherein said slot in said second coupling plate extends approximately radially of said pivot axis of said jaw on which said second coupling plate is provided.

* * * * *